US011851771B1

(12) United States Patent
Wu et al.

(10) Patent No.: US 11,851,771 B1
(45) Date of Patent: Dec. 26, 2023

(54) METHOD FOR CONSTRUCTING POROUS MICRO-NANO STRUCTURE, AND MATERIAL WITH POROUS MICRO-NANO STRUCTURE

(71) Applicant: GUANGDONG UNIVERSITY OF TECHNOLOGY, Guangzhou (CN)

(72) Inventors: Xinghua Wu, Guangzhou (CN); Guohuang Tan, Guangzhou (CN); Minghao Xiao, Guangzhou (CN); Wei Meng, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 18/316,196

(22) Filed: May 11, 2023

(30) Foreign Application Priority Data

May 18, 2022 (CN) .......................... 202210542970.9

(51) Int. Cl.
*B29C 33/42* (2006.01)
*C23C 4/12* (2016.01)
(Continued)

(52) U.S. Cl.
CPC .................. *C23C 4/12* (2013.01); *C23C 4/11* (2016.01); *C23C 4/18* (2013.01); *C09D 1/00* (2013.01); *C09D 5/1681* (2013.01)

(58) Field of Classification Search
CPC .... C23C 4/12; C23C 4/11; C23C 4/18; C09D 1/00; C09D 5/1681
See application file for complete search history.

(56) References Cited

U.S. PATENT DOCUMENTS 5,302,414 A * 4/1994 Alkhimov ............. B05B 7/1486
427/195
8,486,319 B2 * 7/2013 Victor ..................... B29C 59/02
264/293
(Continued)

FOREIGN PATENT DOCUMENTS

| CN | 102102168 A | 6/2011 |
| CN | 105689236 A | 6/2016 |

(Continued)

OTHER PUBLICATIONS

Luo Yuting et al., Review on Anodizing Technologies for the Fabrication of Superhydrophobic Aluminum-based Surfaces, China Academic Journal Electronic Publishing House, Jun. 2016, pp. 89-96, vol. 30, Issue 6, China.

*Primary Examiner* — Nathan T Leong
(74) *Attorney, Agent, or Firm* — True Shepherd LLC; Andrew C. Cheng

(57) ABSTRACT

A method for constructing a porous micro-nano structure, includes: thoroughly mixing glass powders and metal powders to obtain a mixture; coating the mixture on a surface of a substrate, and forming a coating on the surface, wherein a temperature of forming the coating and a melting point of the glass powders comply with the following formula: $T_{forming} \geq T_{glass} - 50°$ C.; and constructing a surface structure of the coating to obtain a porous micro-nano structure coating on the surface, such that a material with a porous micro-nano structure is obtained. The method is simple and has a low cost. The porous micro-nano structure coating prepared has excellent mechanical stability.

6 Claims, 12 Drawing Sheets

(51) Int. Cl.
  *C23C 4/18*   (2006.01)
  *C23C 4/11*   (2016.01)
  *C09D 1/00*   (2006.01)
  *C09D 5/16*   (2006.01)

(56) References Cited

U.S. PATENT DOCUMENTS

2004/0224321 A1    11/2004   Nicolau et al.
2009/0011222 A1*   1/2009    Xiu .................. C23C 24/00
                                                427/430.1
2015/0299889 A1    10/2015   Mertens et al.
2022/0373266 A1    11/2022   Zhu et al.

FOREIGN PATENT DOCUMENTS

CN       106182725  A    12/2016
CN       113735449  A    12/2021
WO       2007126432 A1   11/2007
WO       2021095043 A1    5/2021

* cited by examiner

METHOD FOR CONSTRUCTING POROUS MICRO-NANO STRUCTURE, AND MATERIAL WITH POROUS MICRO-NANO STRUCTURE

CROSS-REFERENCE TO RELATED APPLICATIONS

This application claims priority to Chinese Patent Application No. 202210542970.9 with a filing date of May 18, 2022. The content of the aforementioned application, including any intervening amendments thereto, is incorporated herein by reference.

TECHNICAL FIELD

The present disclosure relates to the field of material surface techniques, and in particular to a method for constructing a porous micro-nano structure, and a material with the porous micro-nano structure.

BACKGROUND

A porous micro-nano structure is necessary for superhydrophobic and superhydrophilic coating surfaces, and superhydrophobic and superhydrophilic surfaces can be obtained by controlling surface energy of the porous structure. Superhydrophobic and superhydrophilic surfaces refer to surfaces with special wettabilities. The superhydrophilic surface generally refers to a surface with a water contact angle of less than 10°, and water droplets can completely spread over the superhydrophilic surface. The superhydrophobic surface refers to a surface with a water contact angle of more than 150° and a roll-off angle of less than 10° C.

It is found that there is a nanostructure in the lotus leafs, a prototype for the superhydrophobic surface. It is reported that the binary synergistic effect of the micro-nano structure is a key factor for superhydrophilic and superhydrophobic performance. Therefore, it is necessary to construct a rough micro-nano structure for the preparation of superhydrophilic and superhydrophobic surfaces. At present, specific methods for preparing the rough micro-nano structure include a template method, an etching method, a sol-gel method, a vapor deposition method, and a layer-by-layer self-assembly method, etc. However, most of these methods involve a complicated process, a special device, and a relatively high energy consumption and cost, which are not conducive to industrial production. In addition, the surfaces with the rough micro-nano structure prepared by existing methods generally have insufficient mechanical stability, and are easily destroyed during scratching and bending, and hence lose the original characteristics.

SUMMARY OF PRESENT INVENTION

In one aspect, the present disclosure is to provide a method for constructing a porous micro-nano structure. By adopting this method, a coating with porous micro-nano structure may be prepared with a simple process and a low cost, which solves the problem in the prior at that the processes for preparing the coatings with a micro-nano structure are complicated and the costs are high.

In another aspect, the present disclosure is to provide a coating with a porous micro-nano structure which has excellent mechanical stability, to solve the problem that the existing coatings have poor mechanical stability.

In yet another aspect, the present disclosure is to provide a material with a porous micro-nano structure that has excellent mechanical stability, to solve the problem that the existing materials have poor mechanical stability.

In order to achieve the above objectives, the present disclosure adopts the following technical solutions:

A method for constructing a porous micro-nano structure includes the following steps:
(1) thoroughly mixing glass powders and metal powders to obtain a mixture;
(2) cleaning a surface of a substrate to be coated, and drying the surface for later use;
(3) coating the mixture onto the surface of the substrate, and conducting a film-forming treatment to form a coating on the surface of the substrate, wherein a temperature of the film-forming treatment and a melting point of the glass powders comply with the following formula:

$$T_{forming} \geq T_{glass} - 50° C.,$$

wherein $T_{forming}$ represents the temperature of the film-forming treatment and $T_{glass}$ represents the melting point of the glass powders; and
(4) constructing a surface structure of the coating to obtain a porous micro-nano structure coating on the surface of the substrate, wherein the surface structure of the porous micro-nano structure coating is of a porous micro-nano structure; and a method for constructing the surface structure comprises one or more selected from the group consisting of acid etching treatment, alkali etching treatment, and anodic oxidation treatment.

Preferably, the temperature of the film-forming treatment in step (3) is in a range from 100° C. to 1,500° C., and the temperature of the film-forming treatment and the melting point of the glass powders comply with the following formula:

$$T_{forming} \geq T_{glass} - 50° C.,$$

wherein $T_{forming}$ represents the temperature of the film-forming treatment and $T_{glass}$ represents the melting point of the glass powders.

Preferably, the film-forming treatment is any one of heating, sintering, and laser cladding.

Preferably, the melting point of the glass powders is lower than 700° C.

Preferably, calculated in mass percentage, the mixture in step (1) includes 10 wt % to 90 wt % of the glass powders and 10 wt % to 90 wt % of the metal powders; and the metal powders are elemental metal powders or mixed metal powders.

Preferably, particle sizes of the glass powders are in a range from 500 mesh to 3,000 mesh and particle sizes of the metal powders are in a range from 50 nm to 100 μm.

Preferably, a substance with a low surface energy is used to modify the surface of the porous micro-nano structure coating in step (4), such that the porous micro-nano structure coating has superhydrophobic performance.

Preferably, the substance with a low surface energy is one or a combination of two or more selected from the group consisting of stearic acid, tetradecanoic acid, a silane coupling agent (SCA), a fluoride (such as a fluoroalkyl silane), and a silane reagent.

Preferably, an acidic solution used for the acid etching treatment in step (4) is one or a combination of two or more selected from the group consisting of hydrofluoric acid, phosphoric acid, sulfuric acid, and oxalic acid;

an alkaline solution used for the alkali etching treatment is one or a combination of two or more selected from the group consisting of hydroxide, zinc chloride, and copper chloride; and an electrolyte used for the anodic oxidation treatment is one or a combination of two or more selected from the group consisting of hydrofluoric acid, phosphoric acid, sulfuric acid, oxalic acid, ammonium fluoride, phosphate, and chromate.

Preferably, a material of the substrate is one or a combination of two or more selected from the group consisting of fabric, organic panel, metal mesh, aluminum, titanium, copper, iron, stainless steel, alloy, and metal matrix composite (MMC).

A porous micro-nano structure coating prepared by above method is provided.

A material with a porous micro-nano structure includes: a substrate and the porous micro-nano structure coating described above and coated on a surface of the substrate. A surface of the porous micro-nano structure coating has a porous micro-nano structure.

The above technical solutions have the following beneficial effects:

1. The present disclosure provides a method for preparing a porous micro-nano structure coating with low cost and simple process, which can effectively overcome the problem that the existing coatings have poor mechanical stability. The porous micro-nano structure coating prepared exhibits strong adhesion to the substrate. In addition, due to the usage of the glass powders, the porous micro-nano structure coating has excellent mechanical stability and prominent wear resistance. The substrate coated with the porous micro-nano structure coating is superhydrophilic even if the substrate is bent.

2. The surface of the porous micro-nano structure coating can be modified from being superhydrophilic to being superhydrophobic by using a substance with a low surface energy. The modified porous micro-nano structure coating has a large water contact angle, a small roll-off angle, strong adhesion, and excellent wear resistance, and can be widely used in the fields of anti-icing, anti-condensation, anti-fouling, oil-water separation, self-cleaning, and so on.

DETAILED DESCRIPTION OF THE EMBODIMENTS

Figure 1:
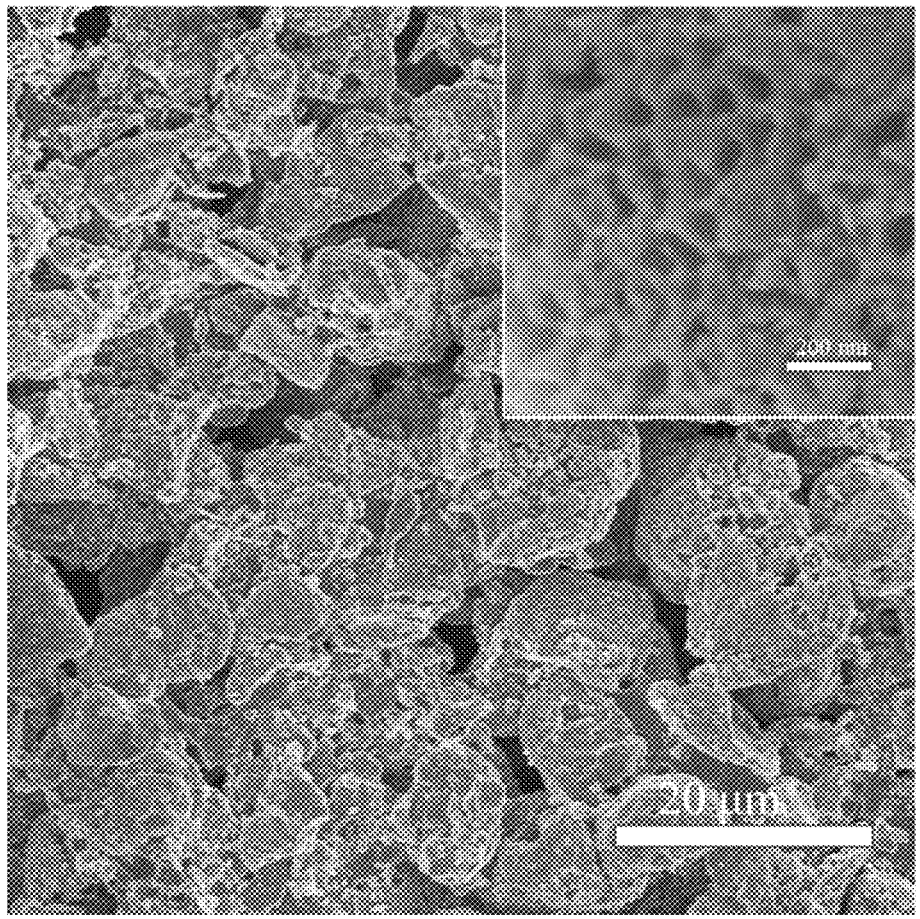
FIG. 1 shows a surface morphology of the porous micro-nano structure coating prepared in Example 1.
Figure 2:
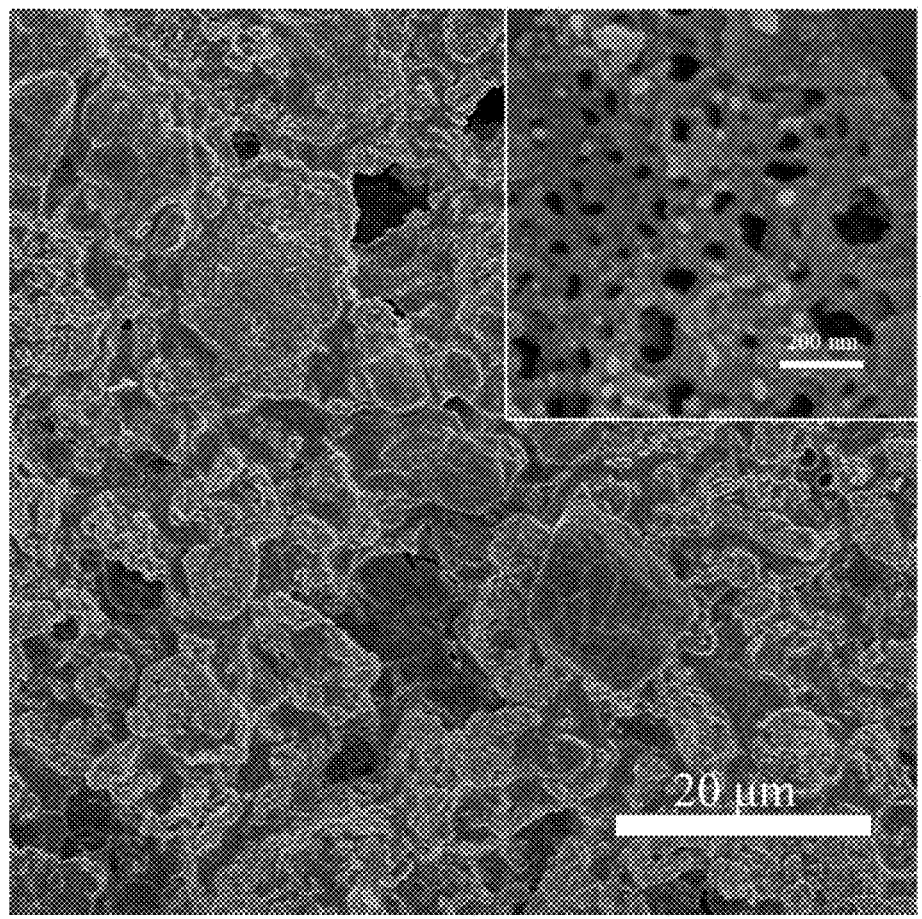
FIG. 2 shows a surface morphology of the porous micro-nano structure coating prepared in Example 2.
Figure 3:
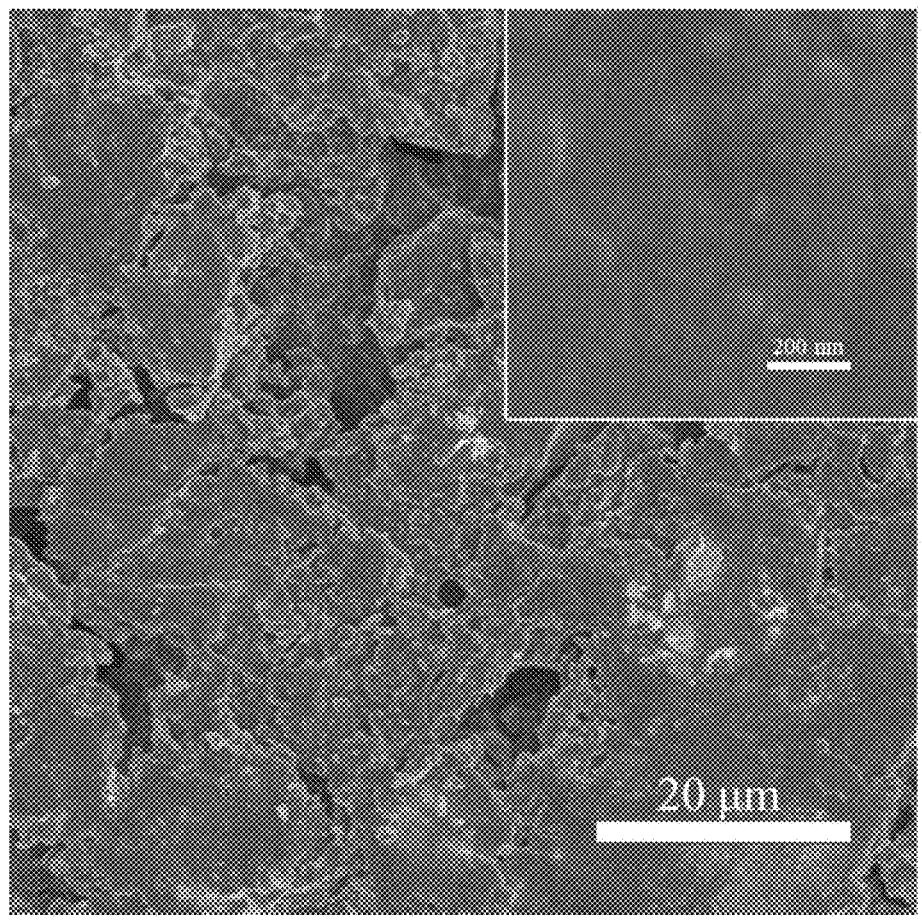
FIG. 3 shows a surface morphology of the porous micro-nano structure coating prepared in Example 3.
Figure 4:
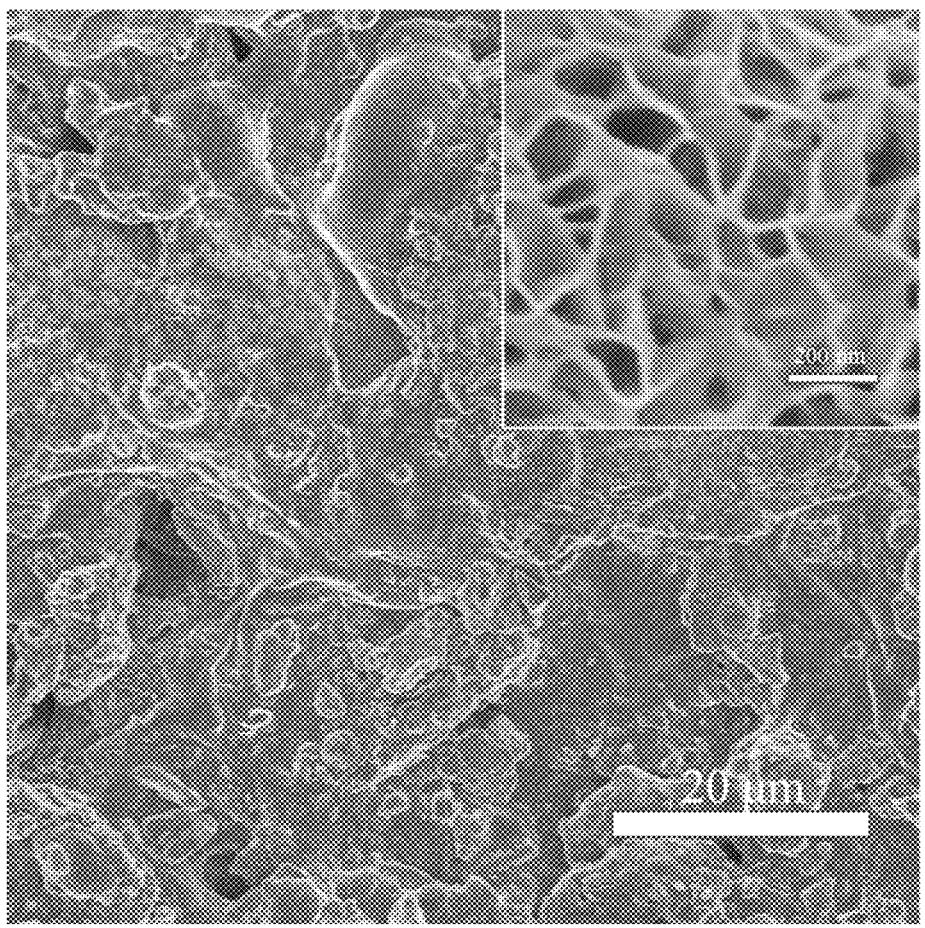
FIG. 4 shows a surface morphology of the porous micro-nano structure coating prepared in Example 4.
Figure 5:
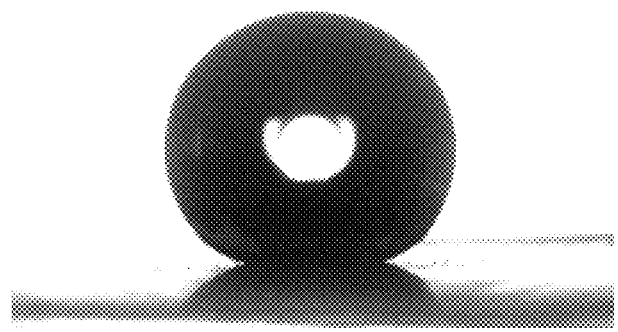
FIG. 5 shows a static water contact angle of the porous micro-nano structure coating with superhydrophobic performance prepared in Example 1.
Figure 6:
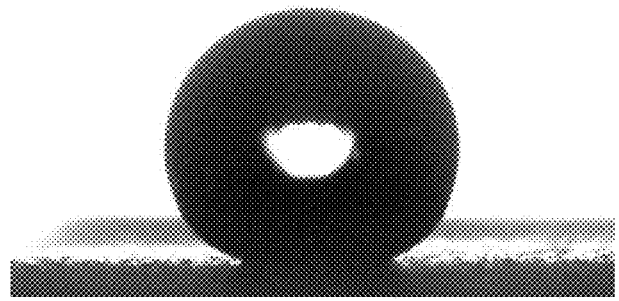
FIG. 6 shows a static water contact angle of the porous micro-nano structure coating with superhydrophobic performance prepared in Example 2.
Figure 7:
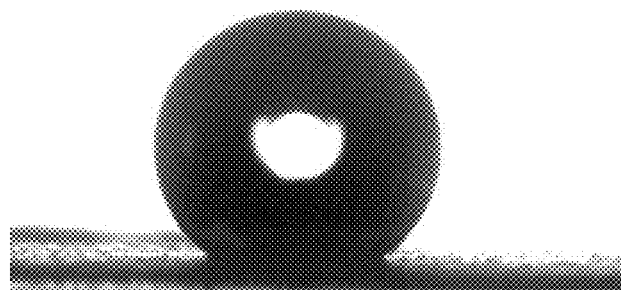
FIG. 7 shows a static water contact angle of the porous micro-nano structure coating with hydrophobic performance prepared in Example 3.
Figure 8:
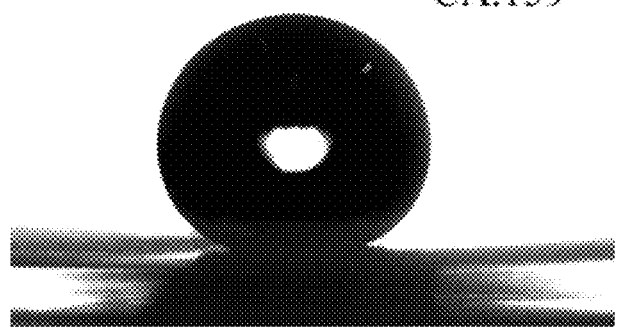
FIG. 8 shows a static water contact angle of the porous micro-nano structure coating with superhydrophobic performance prepared in Example 4.

The technical solutions of the present disclosure will be further described below with reference to the accompanying drawings and specific embodiments.

A method for constructing a porous micro-nano structure is provided, including the following steps:

(1) thoroughly mixing glass powders and metal powders to obtain a mixture;

(2) cleaning a surface of a substrate to be spray-coated, and drying the surface for later use;

(3) coating the mixture onto the surface of the substrate, and conducting a film-forming treatment to form a coating on the surface of the substrate, wherein a temperature of the film-forming treatment and a melting point of the glass powders comply with the following formula:

$$T_{forming} \geq T_{glass} - 50° \text{ C.,}$$

wherein $T_{forming}$ represents the temperature of the film-forming treatment and $T_{glass}$ represents the melting point of the glass powders; and (4) constructing a surface structure of the coating to obtain a porous micro-nano structure coating on the surface of the substrate, wherein the surface structure of the porous micro-nano structure coating is of a porous micro-nano structure; a material with a porous micro-nano structure is obtained; and a method for constructing the surface structure comprises one or a combination of two or more selected from the group consisting of acid etching treatment, alkali etching treatment, and anodic oxidation treatment.

In the prior art, most of the methods for preparing a micro-nano rough structure involve a complicated process, a special device, and a relatively high energy consumption and cost, which are not conducive to industrial production. In addition, the surfaces with the rough micro-nano structure prepared by existing methods generally have insufficient mechanical stability, and are easily destroyed during scratching and bending, and hence lose the original characteristics.

In order to solve the above problems, the present disclosure provides the above method to prepare the porous micro-nano structure coating, which can effectively overcome the problem that the existing coatings have poor mechanical stability. In this method, the glass powders and the metal powders are firstly mixed thoroughly to obtain the mixture; the mixture is then coated on the surface of the substrate; a film-forming treatment is then conducted to make the glass powders melted and adhered to the surface of the substrate; the substrate is then cooled, such that the coating and the substrate are tightly combined as one; and finally an acid etching, alkali etching, or anodic oxidation treatment is conducted, such that a part of the metal powders in the coating react to form a porous micro-nano structure coating. According to the Wenzel's theory, the rougher the surface structure of a hydrophilic material, the stronger the hydrophilicity. Since the glass powders and the metal powders are hydrophilic, the prepared porous micro-nano structure has superhydrophilic performance, and the prepared porous micro-nano structure coating hence has superhydrophilic performance. The porous micro-nano structure coating prepared exhibits strong adhesion to the substrate. In addition, due to the usage of the glass powders, the porous micro-nano structure coating has excellent mechanical stability and prominent wear resistance. The substrate coated with the porous micro-nano structure coating is superhydrophilic even if the substrate is bent.

The method for constructing the porous micro-nano structure in the present disclosure has advantages such as low cost, simple processes, and is applicable for large-scale production. The porous micro-nano structure coating prepared by this method has perfect wettability of water, a lubricated hydrophilic surface, and excellent wear resistance, and can be widely used in the fields of underwater drag reduction, anti-fouling, anti-bacteria, biomedicine, and so on.

Preferably the temperature of the film-forming treatment in step (3) is in a range from 100° C. to 1,500° C., and the temperature of the film-forming treatment and the melting point of the glass powders comply with the following formula:

$$T_{forming} \geq T_{glass} - 50° C.,$$

wherein $T_{forming}$ represents the temperature of the film-forming treatment and $T_{glass}$ represents the melting point of the glass powders.

Preferably, the film-forming treatment is any one of heating, sintering, and laser cladding.

It should be noted that the temperature of the film-forming treatment is in a range from 100° C. to 1,500° C., and the temperature of the film-forming treatment and the melting point of the glass powders comply with the formula of $T_{forming} \geq T_{glass} - 50° C.$, which ensures that the glass powders are melted and firmly adhered to the surface of the substrate during the film-forming treatment. Since the glass powders have high hardness and excellent wear resistance, the adhesion of the porous micro-nano structure coating to the substrate can be significantly improved, and the porous micro-nano structure coating exhibits excellent wear resistance. The coating can hardly be destroyed during scratching and bending, and the original characteristics of the coating are kept even after it is bent and scratched, which solves the problem of insufficient mechanical stability in the rough micro-nano structures prepared by existing methods.

Preferably, sintering is adopted for the film-forming treatment in one embodiment. The substrate coated with the mixture obtained in step (1) is heated to 100° C. to 1,500° C. at a heating rate of 5° C./min to 25° C./min and kept at the temperature for 1 h to 4 h in an electric furnace, such that the glass powders are fully melted to form a coating on the surface of the substrate.

Further, in step (1), calculated in mass percentage, the mixture includes 10 wt % to 90 wt % of the glass powders and 10 wt % to 90 wt % of the metal powders.

Specifically, when the mixture includes 10 wt % to 90 wt % of the glass powders and 10 wt % to 90 wt % of the metal powders, a porous micro-nano structure can be constructed, and a porous micro-nano structure layer can be formed on the surface of the substrate. If only the glass powders are used, it is difficult to construct a porous micro-nano structure during the acid etching treatment, alkali etching treatment, or anodic oxidation treatment. If only the metal powders are used, the metal powders can be hardly adhered to the surface of the substrate to form a coating during the sintering due to its high melting point. Since most of the metal powders will be converted into metal ions and thus lost during the acid etching treatment, alkali etching treatment, or anodic oxidation treatment, it is difficult to construct a porous micro-nano structure.

Preferably, the glass powders and the metal powders are mixed in a mass ratio of (1-5):1; and the porous micro-nano structure coating prepared according to the above mass ratio has excellent mechanical performance and superhydrophilic performance.

Preferably, the metal powders are elemental metal powders or mixed metal powders.

Preferably, the metal powders are one or a combination of two or more selected from the group consisting of copper powders, iron powders, zinc powders, aluminum powders, and titanium powders.

Preferably, particle sizes of the glass powders are in a range from 500 mesh to 3,000 mesh and particle sizes of the metal powders are in a range from 50 nm to 100 μm.

It should be noted that particle sizes of the glass powders and metal powders should be in microscale or nanoscale for preparing the porous micro-nano structure in the present disclosure. If the particle sizes of the glass powders and the metal powders are too large, it is difficult to prepare the coating with a porous micro-nano structure, and thus it is difficult to prepare the coating with superhydrophilic or superhydrophobic performance.

Preferably, a substance with a low surface energy is used to modify the surface of the porous micro-nano structure coating in step (4), such that the porous micro-nano structure coating has superhydrophobic performance.

It should be noted that, if the surface modification is not conducted, the prepared porous micro-nano structure coating has superhydrophilic performance. However, if the substance with a low surface energy is used to modify the surface of the porous micro-nano structure coating, the surface of the porous micro-nano structure coating can be changed from being superhydrophilic to being superhydrophobic. The modified porous micro-nano structure coating has a large water contact angle, a small roll-off angle, strong adhesion, and excellent wear resistance, and can be widely used in the fields of anti-icing, anti-condensation, anti-fouling, oil-water separation, self-cleaning, and so on.

Preferably, the substance with a low surface energy includes one or a combination of two or more selected from the group consisting of stearic acid, tetradecanoic acid, an SCA, a fluoride, and a silane reagent.

Preferably, an acidic solution used for the acid etching treatment in step (4) is one or a combination of two or more selected from the group consisting of hydrofluoric acid, phosphoric acid, sulfuric acid, and oxalic acid;

an alkaline solution used for the alkali etching treatment is one or a combination of two or more selected from the group consisting of hydroxide, copper chloride, and ammonium chloride; and an electrolyte used for the anodic oxidation treatment is one or a combination of two or more selected from the group consisting of hydrofluoric acid, phosphoric acid, sulfuric acid, oxalic acid, ammonium fluoride, phosphate, and chromate.

It should be noted that the method for constructing the porous micro-nano structure disclosed in the present disclosure has a wide range of applications. In this method, metal powders of different types can be mixed with the glass powders, and metals of different types can be used as the substrate. The porous micro-nano structure coating prepared has excellent mechanical stability and prominent self-cleaning, anti-condensation, and bendability performance.

Preferably, a material of the substrate is one or a combination of two or more selected from the group consisting of fabric, organic panel, metal mesh, aluminum, titanium, copper, iron, stainless steel, alloy, and MMC.

Specifically, MMCs are composites obtained by artificially combining a metal and an alloy thereof as a matrix with one or more metal or non-metal reinforcement materials, and most of the reinforcement materials may be inorganic non-metals such as ceramics, carbon, graphite, and boron, and may also be metal wires.

A porous micro-nano structure coating prepared by the above method is provided.

A material with a porous micro-nano structure prepared by the above method is provided, including: a substrate and the porous micro-nano structure coating coated on a surface of the substrate. A surface of the porous micro-nano structure coating has a porous micro-nano structure.

It should be noted that the material with a porous micro-nano structure prepared in the present disclosure has both excellent mechanical stability and superhydrophilic or superhydrophobic performance, and has promising application prospects in architectural glass, icebreaker hulls, automobiles, satellite dishes, radars, and high-voltage wires, and even in locomotives and aircraft coatings.

The technical solutions of the present disclosure will be further described below with reference to the following examples.

Example 1

A method for constructing a porous micro-nano structure was provided, including the following steps:
(1) The glass powders and the metal powders were thoroughly mixed to obtain a mixture, and the mixture was prepared into a suspension with absolute ethanol as a solvent. The melting point of the glass powders was lower than 600° C.; the metal powders were pure aluminum powders; the particle sizes of the glass powders and the metal powders were 20 μm; a mass ratio between the glass powders and the metal powders in the mixture was 1:1; and the mixture was obtained through wet ball-milling with a rotational speed of 200 rpm for 3 hours and a ball-to-material ratio of 10:1.
(2) A surface of a substrate to be spray-coated was cleaned and then dried for later use. Specifically, an aluminum sheet was used as the substrate, and the aluminum sheet was ultrasonically cleaned for 10 min in deionized water and 10 min in absolute ethanol respectively to remove oil and other stains adhered to the surface of the aluminum sheet.
(3) The suspension obtained was coated onto the surface of the aluminum sheet, and the aluminum sheet after coated was heated to 600° C. at a heating rate of 20° C./min and kept at the temperature for 2 h in an electric furnace for sintering, then naturally cooled to room temperature, and taken out, such that a coating was formed on the surface of the aluminum sheet to obtain an initial sample.
(4) The initial sample was subjected to an anodic oxidation treatment specifically as follows: with the initial sample as an anode and a graphite sheet as a cathode, oxidation was conducted for 100 min at a voltage of 200 V and a temperature of 5° C. in a 2.0 mol/L phosphoric acid solution; the oxidized sample was ultrasonically cleaned for 10 min in deionized water to remove the residual phosphoric acid solution on a surface of the oxidized sample; then the cleaned sample was dried in an oven, such that a porous micro-nano structure coating with superhydrophilic performance was formed on the surface of the substrate; and the dried sample was soaked in a substance with a low surface energy (perfluorodecyltriethoxysilane), taken out, ultrasonically cleaned for 5 min in deionized water, and then baked in a 130° C. oven for 1 h to obtain a material with a porous micro-nano structure. The prepared material with a porous micro-nano structure had superhydrophobic performance.

Example 2

A method for constructing a porous micro-nano structure was provided, including the following steps:
(1) The glass powders and the metal powders were thoroughly mixed to obtain a mixture, and the mixture was prepared into a suspension with absolute ethanol as a solvent. The melting point of the glass powders was lower than 500° C.; the metal powders were pure aluminum powders; particle sizes of the glass powders and the metal powders were 20 μm; a mass ratio between the glass powders and the metal powders in the mixture was 4:2; and the mixture was obtained through wet ball-milling with a rotational speed of 200 rpm for 3 hours and a ball-to-material ratio of 10:1.
(2) A surface of a substrate to be spray-coated was cleaned and then dried for later use. Specifically, an aluminum sheet was used as the substrate, and the aluminum sheet was ultrasonically cleaned for 10 min in deionized water and 10 min in absolute ethanol respectively to remove oil and other stains adhered to the surface of the aluminum sheet.
(3) The suspension obtained was coated onto the surface of the aluminum sheet, and the aluminum sheet after coated was heated to 500° C. at a heating rate of 10° C./min and kept at the temperature for 3 h in an electric furnace for sintering, then naturally cooled to room temperature, and taken out, such that a coating was formed on the surface of the aluminum sheet to obtain an initial sample.
(4) The initial sample was subjected to an anodic oxidation treatment specifically as follows: with the initial sample as an anode and a graphite sheet as a cathode, oxidation was conducted for 100 min at a voltage of 200 V and a temperature of 5° C. in a 2.0 mol/L phosphoric acid solution; the oxidized sample was ultrasonically cleaned for 10 min in deionized water to remove the residual phosphoric acid solution on a surface of the oxidized sample; then the cleaned sample was dried in an oven, such that a porous micro-nano structure coating with superhydrophilic performance was formed on the surface of the substrate; and the dried sample was soaked in a substance with a low surface energy (stearic acid), taken out, ultrasonically cleaned for 5 min in deionized water, and then baked in a 130° C. oven for 1 h to obtain a material with a porous micro-nano structure. The prepared material with a porous micro-nano structure had superhydrophobic performance.

Example 3

The method in this example was basically the same as that in Example 1, except that, the mass ratio between the glass powders to the metal powders in the mixture was 5:1 in step (1).

Example 4

A method for constructing a porous micro-nano structure was provided, including the following steps:
(1) The glass powders and the metal powders were thoroughly mixed to obtain a mixture, and the mixture was prepared into a suspension with absolute ethanol as a solvent. The melting point of the glass powders was lower than 600° C.; the metal powders were pure titanium powders; particle sizes of the glass powders and the metal powders were 20 μm; a mass ratio between the glass powders and the metal powders in the mixture was 1:1; and the mixture was obtained through wet ball-milling with a rotational speed of 200 rpm for 3 hours and a ball-to-material ratio of 10:1.
(2) A surface of a substrate to be spray-coated was cleaned and then dried for later use. Specifically, an aluminum sheet was used as the substrate, and the aluminum sheet was ultrasonically cleaned for 10 min in deionized water and 10 min in absolute ethanol respectively to remove oil and other stains adhered to the surface of the aluminum sheet.
(3) The suspension obtained was coated onto the surface of the aluminum sheet, and the aluminum sheet after coated was heated to 600° C. at a heating rate of 20° C./min and kept at the temperature for 2 h in an electric furnace for sintering, then naturally cooled to room temperature, and taken out, such that a coating was formed on the surface of the aluminum sheet to obtain an initial sample.
(4) The initial sample was subjected to an anodic oxidation treatment specifically as follows: with the initial sample as an anode and a graphite sheet as a cathode, oxidation was conducted for 100 min at a voltage of 80V and a temperature of 5° C. in a 0.15 wt % ammonium fluoride in ethanol; the oxidized sample was ultrasonically cleaned for 10 min in deionized water to remove the residual ammonium fluoride solution on a surface of the oxidized sample; then the cleaned sample was dried in an oven, such that a porous micro-nano structure coating with superhydrophilic performance was formed on the surface of the substrate; and the dried sample was soaked in a substance with a low surface energy (perfluorodecyltriethoxysilane), taken out, ultrasonically cleaned for 5 min in deionized water, and then baked in a 130° C. oven for 1 h to obtain a material with a porous micro-nano structure. The prepared material with a porous micro-nano structure had superhydrophobic performance.

Example 5

The method in this example was basically the same as that in Example 1, except that, the oxidized and dried sample was not modified using the substance with a low surface energy in step (4), such that a resulting material with a porous micro-nano structure had superhydrophilic performance.

Specifically, Scanning Electron Microscope (SEM) was used to observe surface morphologies of the porous micro-nano structure coatings obtained after anodic oxidation in Examples 1 to 4, and the SEM results were shown in FIG. 1 to FIG. 4. It can be seen from FIG. 1 to FIG. 4 that the porous micro-nano structure is formed in the surface of each of the porous micro-nano structure coatings prepared in Examples 1 to 4, which provides a guarantee for superhydrophilic and superhydrophobic performance.

The materials each with a porous micro-nano structure obtained in Examples 1 to 4 were subjected to a static water contact angle test, and test results were shown in FIG. 5 to FIG. 8. It can be seen from FIG. 5 to FIG. 8 that the surface of the material with a porous micro-nano structure prepared in Example 1 has a water contact angle of 152°; the surface of the material with a porous micro-nano structure prepared in Example 2 has a water contact angle of 151°; the surface of the material with a porous micro-nano structure prepared in Example 3 has a water contact angle of 141°; and the surface of the material with a porous micro-nano structure prepared in Example 4 has a water contact angle of 159°. In addition, it can be seen from FIG. 5 to FIG. 7 that, with the decrease in the content of the metal powders in the mixture, the water contact angle of the surface of the material with a porous micro-nano structure decreases.

Figure 9:
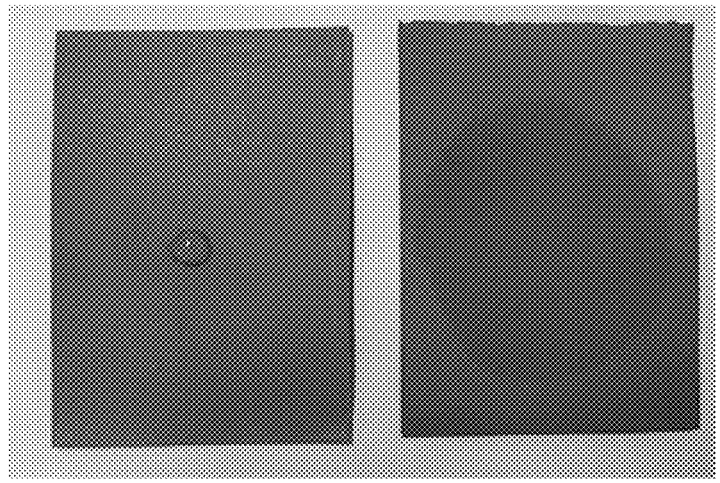
FIG. 9 shows a static water contact state of the porous micro-nano structure coating with superhydrophilic performance prepared in Example 5 and that of the coating before oxidation.

The material with a porous micro-nano structure obtained in Example 5 was subjected to a contact angle test and a control group with the coating obtained before anodic oxidation is provided, and test results were shown in FIG. 9. In FIG. 9, the left figure shows a water contact state of the coating obtained before anodic oxidation, and the right figure shows a water contact state of the coating obtained after anodic oxidation. It can be seen from the right figure that a water droplet can be completely spread on the surface of the coating obtained after anodic oxidation and can completely wet the surface, indicating that the porous micro-nano structure coating obtained after anodic oxidation without low surface energy modification in this example has superhydrophilic performance.

The material with a porous micro-nano structure prepared in Example 2 (hereinafter "sample") was subjected to a self-cleaning test, a cross-cut test, and a bendability test, and test results were shown in FIG. 10 to FIG. 12.

A method of the self-cleaning test was as follows: A chalk dust was used to simulate dust pollution. The sample was tilted at an included angle of 20° relative to a horizontal plane, the chalk dust was spread evenly on the surface of the sample, 20 μL of water droplets was slowly added to the surface of the sample, and the dust on the surface of the sample was taken away through the rolling-down of the water droplets, thereby achieving self-cleaning.

A method of the cross-cut test was as follows: A cross-cut tester was used to scratch the coating, and then an adhesive tape was used to determine the shedding of a scratched area, thereby determining the adhesion of the coating to the substrate. Specific operation steps were as follows: a cut guide was used to cut a cross-grid pattern on the coating, with a cut depth throughout the coating; the coating was brushed five times diagonally with a brush, and then the adhesive tape was attached to a cross-cut position, pressed with fingers to make the adhesive tape tightly adhered to the coating, and then torn up with an instantaneous force; and a grid area was observed with a magnifier, and an adhesion level of the coating was determined according to the peeling-off of the coating.

A method of the bendability test was as follows: The sample was bent into an M shape, water droplets were dropped to different bending positions, and shape of the water droplets were observed; and the sample was curled and placed in water, and the wetting of the surface of the sample was observed.

Figure 10:
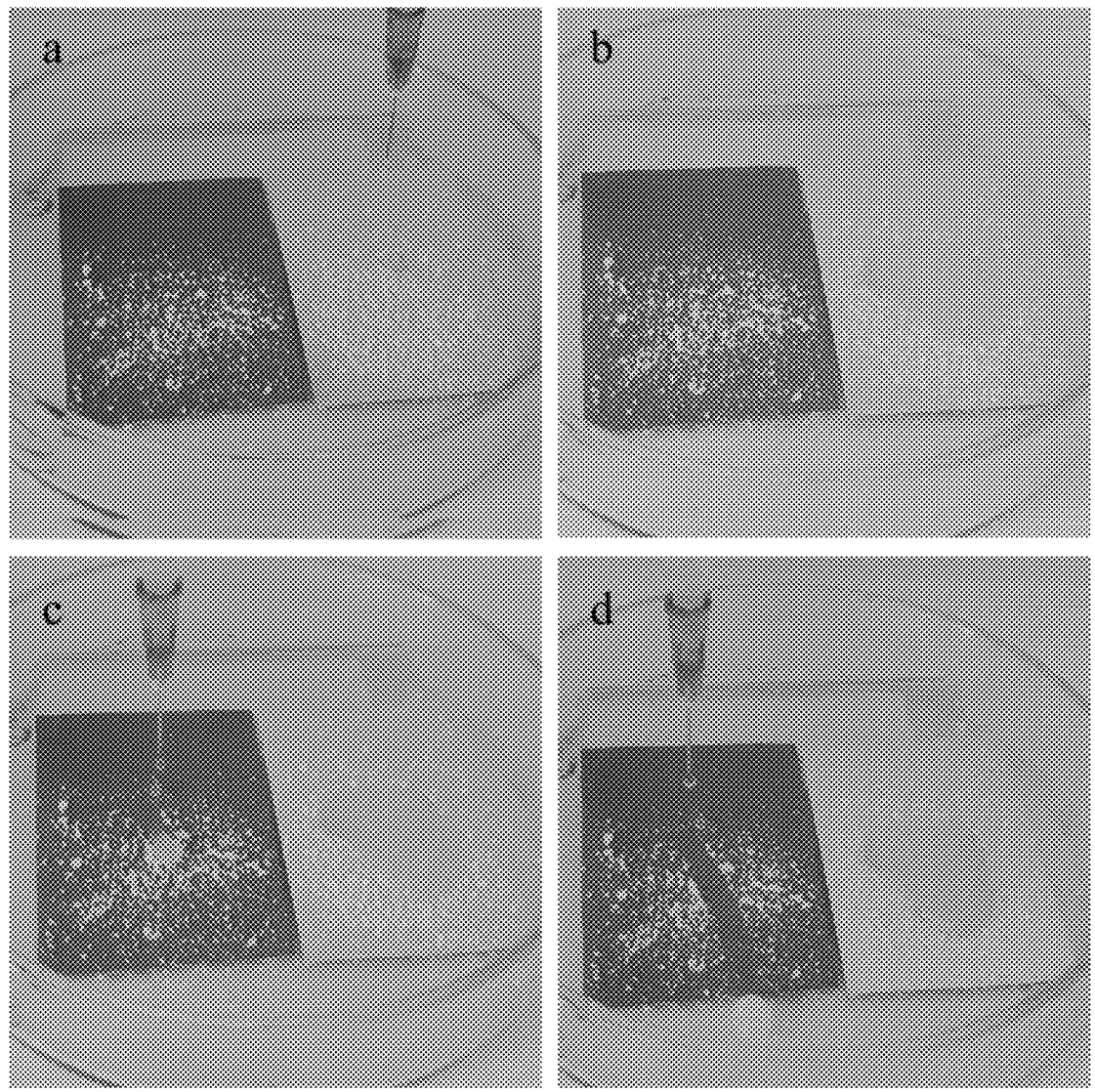
FIG. 10 is shows self-cleaning test results of the porous micro-nano structure coating with superhydrophobic performance prepared in Example 2, wherein a and b represent processes of continuous dripping water droplets on a surface of a pure aluminum sheet; and c and d represent processes of continuous dripping water droplets on a surface of a material with a porous micro-nano structure.
Figure 11:
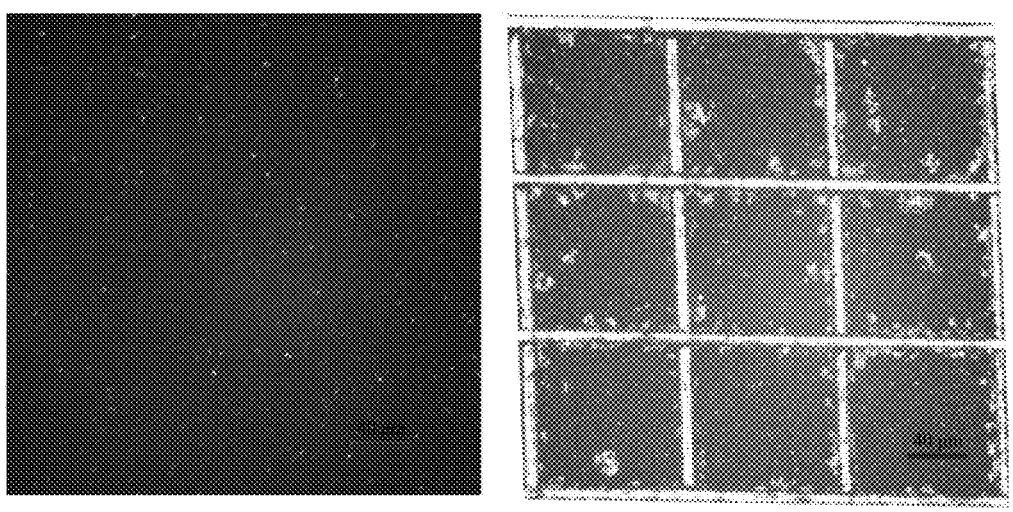
FIG. 11 shows a cross-cut test result of the porous micro-nano structure coating prepared in Example 2.
Figure 12:
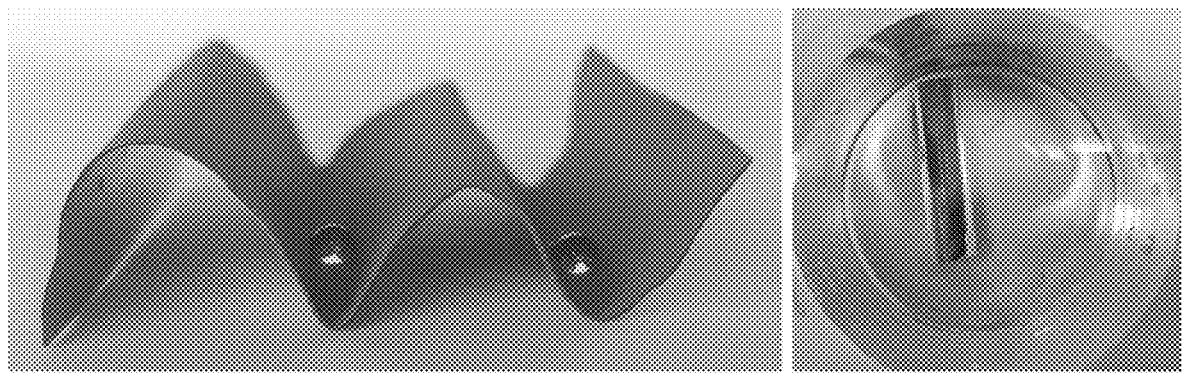
FIG. 12 is shows a bendability test result of the porous micro-nano structure coating prepared in Example 2.

It can be seen from FIG. 10 to FIG. 12 that the coating prepared in Example 2 has excellent self-cleaning performance and mechanical stability. It can be seen from FIG. 10 that water droplets will spread on the surface of the pure aluminum sheet, but due to insufficient gravity, the water droplets fail to take away pollutants on the surface ((b) of FIG. 10). Water droplets are presented as spheres on the surface of material prepared in Example 2 and can well roll off along an inclination direction of the sample to take away the pollutants, forming a clear path ((d) of FIG. 10). This test result shows that the porous micro-nano structure coating prepared in Example 2 has a micro-nano structure, superhydrophobic performance, and low surface energy, and a contact area between pollutants and the surface is reduced, such that the water droplets rolled off can easily take away pollutants to achieve a self-cleaning effect. It can be seen from FIG. 11 that a small piece is peeled off at an intersection of cuts, and an actual damage within a cross-grid area does not exceed 5%, which shows that the coating reaches a 4B level according to American Society for Testing and Material (ASTM) standard. It can be seen from FIG. 12 that the water droplets dropped to different bending positions of the sample bent into M shape can still remain spherical, indicating that the coating still retains the porous micro-nano structure after being bent; and after the sample is curled and placed in water, a water film is formed on the surface of the coating, indicating that the coating still has strong water repellency after being curled.

The technical principles of the present disclosure are described above with reference to specific examples. These descriptions are merely intended to explain the principles of the present disclosure, and may not be construed as limiting the protection scope of the present disclosure in any way. Based on the explanation herein, those of ordinary skill in the art may derive other specific implementations without creative effort, and these implementations should fall within the protection scope of the present disclosure.

What is claimed is:

1. A method for constructing a porous micro-nano structure, comprising the following steps:
   (1) thoroughly mixing glass powders and metal powders to obtain a mixture, wherein particle sizes of the glass powders are in a range from 500 mesh to 3,000 mesh and particle sizes of the metal powders are in a range from 50 nm to 100 μm;
   (2) cleaning a surface of a substrate to be coated, and drying the surface for later use;
   (3) coating the mixture onto the surface of the substrate, and conducting a film-forming treatment to form a coating on the surface of the substrate, wherein a temperature of the film-forming treatment and a melting point of the glass powders comply with the following formula:

$$T_{forming} \geq T_{glass} - 50° C.,$$

wherein $T_{forming}$ represents the temperature of the film-forming treatment and $T_{glass}$ represents the melting point of the glass powders; and the temperature of the film-forming treatment is in a range from 100° C. to 1,500° C.; and
   (4) constructing a surface structure of the coating to obtain a porous micro-nano structure coating on the surface of the substrate, wherein a surface of the porous micro-nano structure coating has a porous micro-nano structure; and a method for constructing the surface structure comprises one or a combination of two or more selected from a group consisting of acid etching treatment, alkali etching treatment, and anodic oxidation treatment.

2. The method according to claim 1, wherein calculated in mass percentage, the mixture in step (1) comprises 10 wt % to 90 wt % of the glass powders and 10 wt % to 90 wt % of the metal powders.

3. The method according to claim 2, wherein the metal powders in step (1) are elemental metal powders or mixed metal powders.

4. The method according to claim 3, wherein the metal powders in step (1) are one or a combination of two or more selected from a group consisting of copper powders, an iron powder, zinc powders, aluminum powders, and titanium powders.

5. The method according to claim 1, wherein a substance with a low surface energy is used to modify the surface of the porous micro-nano structure coating in step (4), such that the porous micro-nano structure coating has superhydrophobic performance.

6. The method according to claim 1, wherein an acidic solution used for the acid etching treatment in step (4) is one or a combination of two or more selected from a group consisting of hydrofluoric acid, phosphoric acid, sulfuric acid, and oxalic acid;
   an alkaline solution used for the alkali etching treatment is one or a combination of two or more selected from a group consisting of a hydroxide, zinc chloride, and copper chloride; and
   an electrolyte used for the anodic oxidation treatment is one or a combination of two or more selected from a group consisting of hydrofluoric acid, phosphoric acid, sulfuric acid, oxalic acid, ammonium fluoride, phosphate, and chromate.

* * * * *